United States Patent [19]
DeKleine et al.

[11] Patent Number: 5,363,295
[45] Date of Patent: Nov. 8, 1994

[54] COMPACT FLUORESCENT LAMP REFLECTOR

[75] Inventors: Paul C. DeKleine; Rick A. Perkins, both of Holland, Mich.

[73] Assignee: Progressive Technology in Lighting, Inc., Holland, Mich.

[21] Appl. No.: 964,928

[22] Filed: Oct. 22, 1992

[51] Int. Cl.$^5$ .................................................. F21V 7/00
[52] U.S. Cl. ...................................... 362/346; 362/222; 362/260
[58] Field of Search ............... 362/346, 218, 260, 294, 362/222, 264, 310, 373

[56] References Cited

U.S. PATENT DOCUMENTS

| | | |
|---|---|---|
| 4,750,096 | 6/1988 | Lim . |
| 4,779,179 | 10/1988 | Oyama et al. ................. 362/346 |
| 4,964,025 | 10/1990 | Smith ............................. 362/346 |
| 5,067,053 | 11/1991 | Akizuki ....................... 362/346 X |

OTHER PUBLICATIONS

Product Bulletin entitled "First, we shine on paper," published by Lumatech Corporation, Emeryville, Calif., publication date unknown, entire document.

*Primary Examiner*—Larry Jones
*Attorney, Agent, or Firm*—Price, Heneveld, Cooper, DeWitt & Litton

[57] ABSTRACT

A replacement fluorescent lighting device includes a fluorescent lamp having a plurality of parallel tubes elongated along an axis and a reflector with an annual reflecting inner surface surrounding the tubes. The inner surface includes at least one surface, or surface segment, that is defined by a geometric curve rotated at least partially about a given axis, with the curve having a focal point that is laterally offset from the given axis in order to have a focal ring segment to enhance light emitted by the surface of the fluorescent tubes. Multiple surface segments are defined about an axis offset from the lamp axis of elongation and spaced radially around the fluorescent lamp. These segments are positioned at major lumen output lobes of the lamp.

36 Claims, 7 Drawing Sheets

— C = 0°-180° OR 180°-360°
Y = 90°

5,363,295

COMPACT FLUORESCENT LAMP REFLECTOR

BACKGROUND OF THE INVENTION

This invention relates generally to a device for reflecting light emitted by a lamp and more particularly to such a device for use with a compact fluorescent lamp.

Compact fluorescent lamps are widely used as an energy efficient substitute for conventional incandescent lamps. A four-tube compact fluorescent lamp, commonly referred to as a quad-lamp, is capable of producing with between 9 watts and 13 watts the equivalent lumens of an incandescent lamp of much higher wattage. In order to provide replacements for incandescent spot lights and flood lights, it is known to package a compact fluorescent lamp with its required magnetic ballast within a housing having a reflective surface and covered by a lens. One application for such replacement fluorescent lighting device is within a housing recessed within a ceiling.

The problem with such compact fluorescent lamps is that, in contrast to an incandescent lamp which produces light at, essentially, a point source, the fluorescent lamp is elongated along an axis and emits its light from coated surfaces in a direction perpendicular to this elongated axis. Because of the configuration of recessed lighting fixtures, the elongated axis of the fluorescent lamp tubes is aligned with the direction in which the light rays are to be directed. Therefore, essentially all of the light must be properly reflected by a reflector from an emitted direction, perpendicular to the axis of elongation of the tubes, to a direction aligned with the axis of elongation in order to be useful. Light that is not properly reflected into a beam is not useful light.

Replacement spot lights and flood lights utilizing compact fluorescent lamps have traditionally employed the same reflective surface design of incandescent flood lights and spot lights. Such design makes use of the focusing characteristics of a parabolic surface. However, because the characteristics of a fluorescent lamp are different from those of incandescent lamps, such parabolic reflectors are inadequate to meet the needs of compact fluorescent lighting devices as replacements for incandescent lamps.

Another restriction with recessed lighting is the length of the lamp. In order to replace a standard size incandescent lamp, the replacement compact fluorescent device must have a maximum overall length (MOL) that is within a given dimension. Because a longer reflector is capable of reflecting more of the light emitted by the lamp, the tendency has been to increase the length of the reflector in order to reflect more light. However, this restricts the applications to which the compact fluorescent lamp may be applied to those having liberal MOL requirements. Another solution has been to extend the diameter of the reflector in order to gather more useful light. However, just as replacement lighting devices have MOL requirements, there are also maximum diameter limitations. Therefore, there exists a need for improved reflector designs in order to make optimum use of the compact fluorescent lamp as a replacement for incandescent lights.

SUMMARY OF THE INVENTION

The present invention is based upon a realization that the treatment of a compact fluorescent lamp as a point light source produces undesirable compromises in reflector configuration that reduces reflectance efficiency. The invention makes use of the fact that light is emitted from the surface of the tubes of a compact fluorescent lamp and that the light output of a lamp having multiple tubes is not consistent as you travel radially around the axis of elongation of the lamp.

The present invention is embodied in a compact fluorescent lamp reflector, and replacement fluorescent lighting device utilizing such reflector, which includes a body having an annular wall with a reflecting inner surface. The inner surface includes at least one surface segment that is defined by a geometric curve rotated at least partially about a given axis that is generally parallel to the axis of elongation of the fluorescent tubes. Such geometric curve has a focal point wherein light rays emanating from the focal point will be reflected as a colomated beam in a direction generally parallel to the given axis irrespective of the point on the curve contacted by a particular light ray. The focal point for the geometric curve is laterally offset from the given axis. In this manner, the reflecting inner surface segment has a focal ring, or ring segment, rather than a focal point. The location and diameter of the focal ring segment may be arranged to correlate with the surface of an individual fluorescent tube or, generally, to the perimeter surface of the tube bundle.

In a preferred embodiment, reflecting surface segments are arranged around the perimeter of the reflecting surface of the reflector in correspondence with the perimeter surface of individual tubes. Inner and outer reflecting rings are provided, respectively, inboard and outboard of the reflecting surface segments and having focal rings corresponding to the perimeter surface of the fluorescent tube bundle. In this manner, the focal rings and ring segments may be arranged to lie at different longitudinal locations with respect to the axis of elongation of the fluorescent lamp.

These and other objects, advantages and features of this invention will become apparent upon review of the following specification and conjunction with the drawings.

DESCRIPTION OF THE PREFERRED EMBODIMENT

Figure 1:
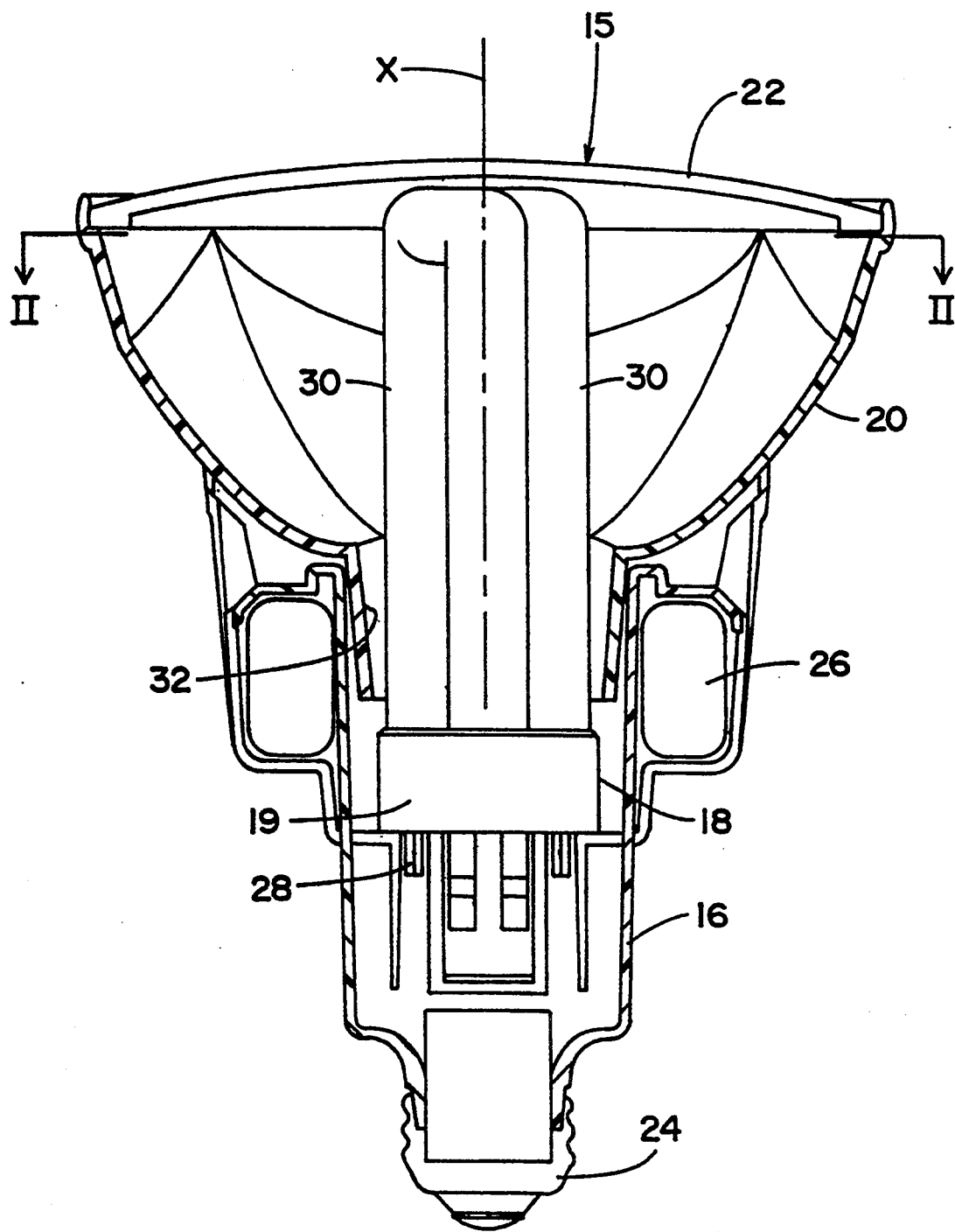
FIG. 1 is a sectioned side elevation of a replacement compact fluorescent lighting device according to the invention.

Referring now specifically to the drawings and the illustrative embodiments depicted therein, a replacement fluorescent lighting device 15 includes a base 16 to which a conventional four-tube compact fluorescent lamp 18 is mounted, a reflector 20 mounted to base 16 encircling lamp 18 and a lens 22 covering reflector 20 (FIG. 1). Base 16 includes a conventional threaded connector 24 for engaging an incandescent lamp socket, a magnetic ballast 26 which surrounds the light-emitting tube portion of lamp 18 and a connector 28 for electrically connecting the contacts of lamp 18 with ballast 26 and connector 24. Lamp 18 is a conventional compact fluorescent lamp which is available in 9 watt capacity and 13 watt capacity. Such lamps are sold by North Americans Philips Lighting Corporation under Model PL. Magnetic ballast 26 is a conventional inductor wound around a stacked laminate core and may be of a toroidal shape, a square shape or a split-C shape. Lens 22 may be relatively clear in order to retain the light reflected by reflector 20 colomated in a beam to thereby make lighting device 15 a spot light. Lens 22 may, alternatively, contain stipples (not shown) in order to defuse the light reflected by reflector 20 thereby making lighting device 15 a flood light. Lamp 18 includes four-tubes 30 which are elongated in the direction of an axis, illustrated in FIG. 1 as axis X.

Figure 4:
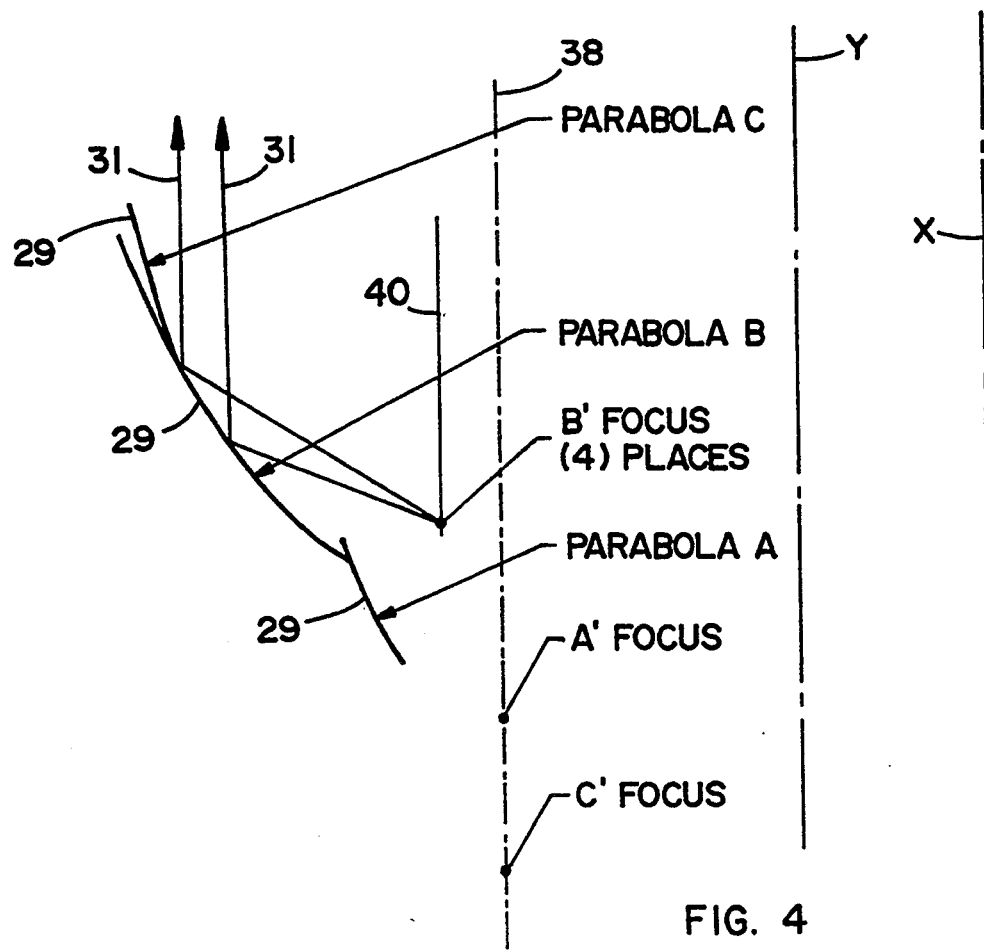
FIG. 4 is a schematic diagram of the geometric relationships of the reflectance surfaces and foci of the reflector in FIG. 3.

Reflector 20, in the illustrated embodiment, includes a body 21 having a reflective inner surface 23 including a first annular reflecting surface 32 surrounding the portion of tubes 30 closest to the base of lamp 18 and a second annular reflecting surface 34 surrounding a distal portion of tubes 30 with respect to base 19. Reflecting inner surface 23 further includes four reflecting surface surface segments 36a, 36b, 36c and 36d which, collectively, surround the midportion of tubes 30. Each surface 32, 34 and each surface segment 36a–36d is defined by a geometric curve 29 swept around an axis. Each geometric curve 29 has a focus whereby light rays 33 emanating from the focus are reflected at the curve into a colomated beam in a direction generally parallel axis X, as best illustrated in FIG. 4.

Figure 2:
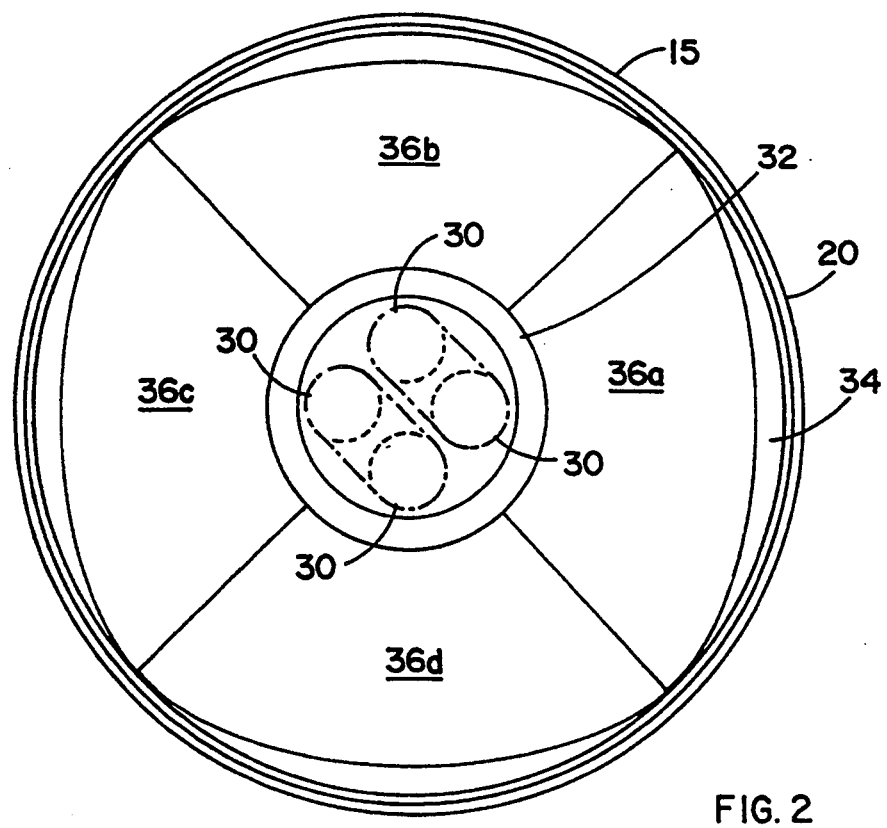
FIG. 2 is a sectional view taken along the lines 2—2 in FIG. 1.
Figure 3:
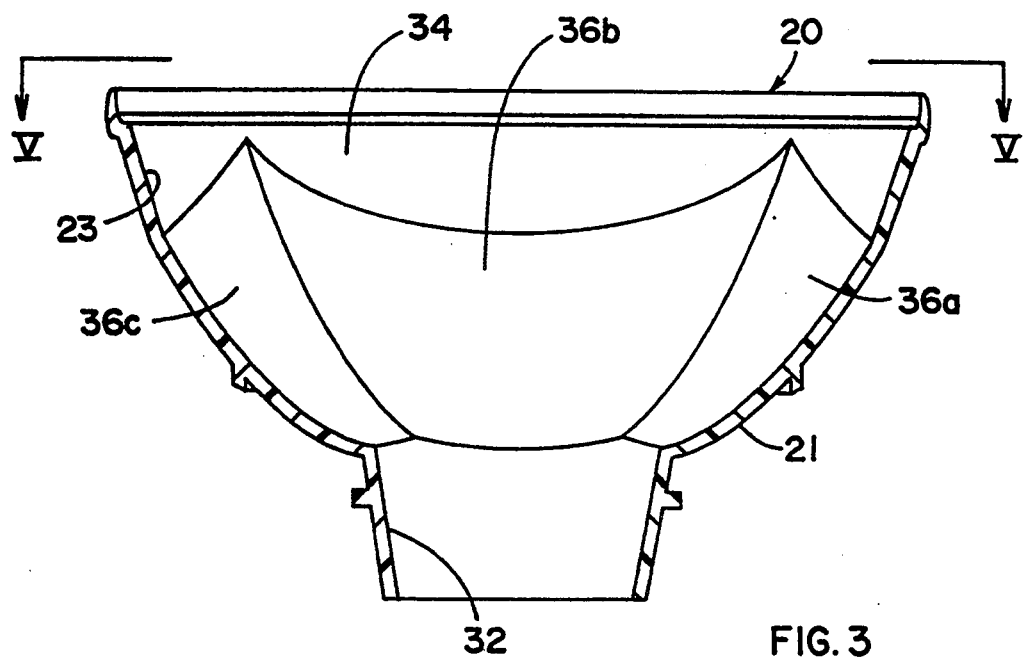
FIG. 3 is the same view as FIG. 1 of the reflector used in the lighting device.
Figure 5:
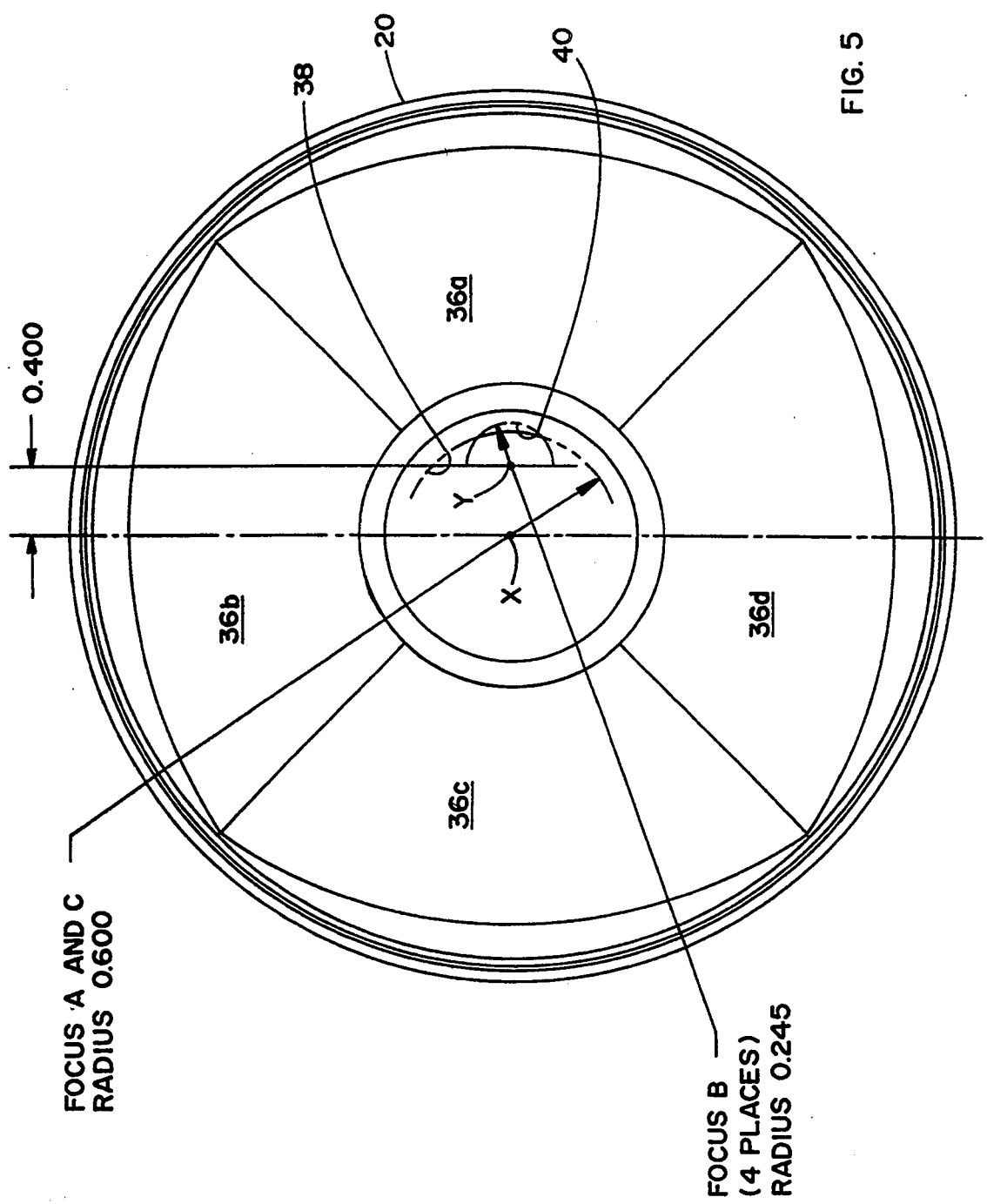
FIG. 5 is a top plan view in the direction of lines 5—5 in FIG. 3, further illustrating the foci in FIG. 4.

First reflecting surface 32 is formed by a geometric curve 29 designated parabola A that is swept around axis X. Parabola A has a focus A' that is offset from axis X defining a focus ring 38 (FIGS. 4 and 5). Each reflecting surface segment 36a–36c is formed by a geometric curve 29 designated parabola B that is swept around an axis Y. Each parabola B has a focus B' that is offset from axis Y defining a focus ring segment 40. Reflecting surface 34 is formed by geometric curve 29 designated parabola C that is swept around axis X. Parabola C has a focus C' that is offset from axis X and, therefore, lies on focus ring 38. There are four focal rings 40 which correspond to the reflecting surface segments 36a–36d. Parabolas A and C have focus rings 38 in order to provide a focus that more closely corresponds with the phosphorous coated surfaces of tubes 30. This causes more of the light generated by the tubes to be properly reflected along the direction of axis A. The four parabolas B which have focus rings 40 in order to provide foci that are even closer to conforming to the surfaces of tubes 30. As seen best in FIG. 2, each reflecting surface segment 36a–36d in this first embodiment is proximate one of the tubes 30.

Figure 6:
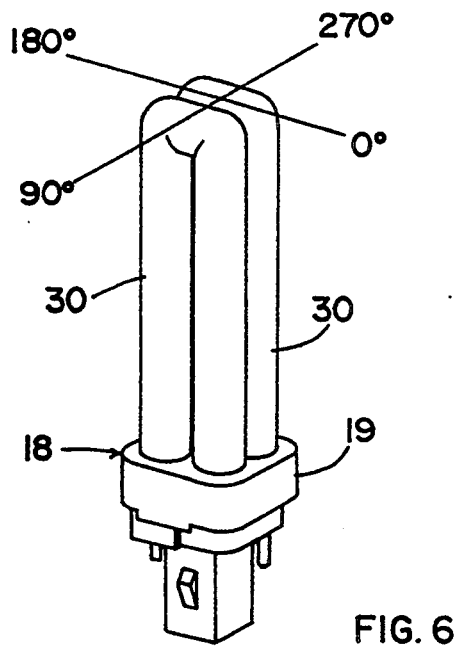
FIG. 6 is a top-side perspective view of a four-tube compact fluorescent lamp.
Figure 7:
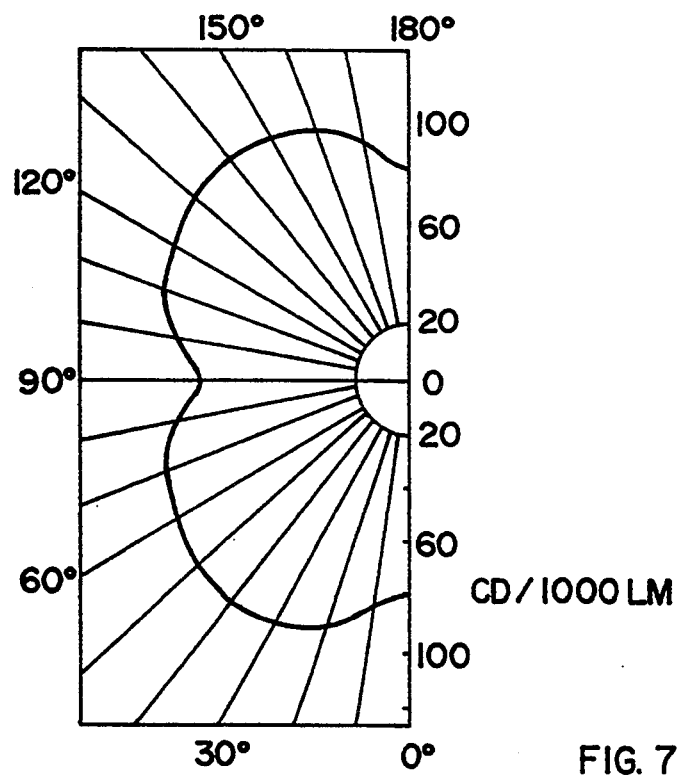
FIG. 7 is a polar graph of the radial light output of the lamp in FIG. 6.
Figure 8A:
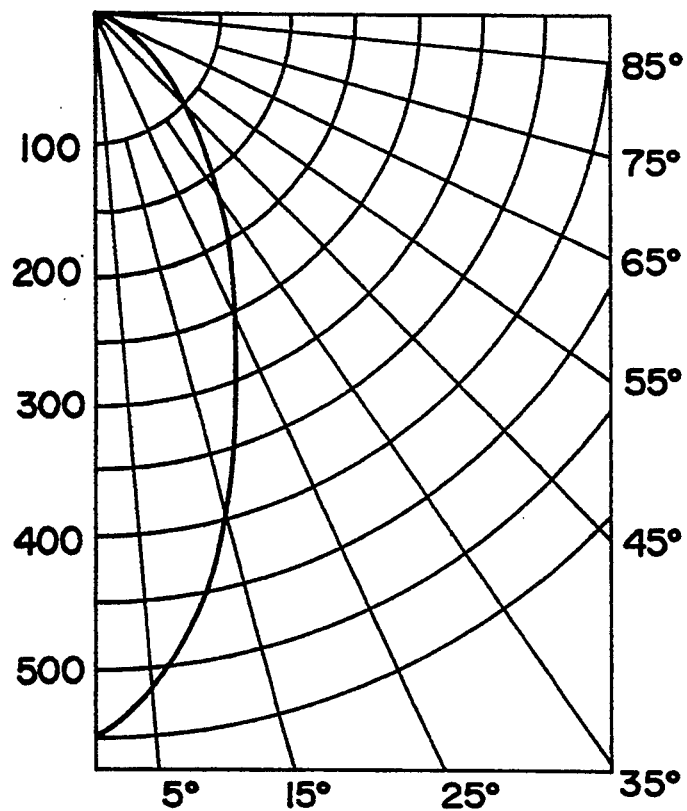
FIG. 8a and 8b are diagrams comparing the respective light outputs of a replacement fluorescent lighting device according to the invention (FIG. 8a) with a conventional replacement fluorescent lighting device (FIG. 8b)
Figure 8B:
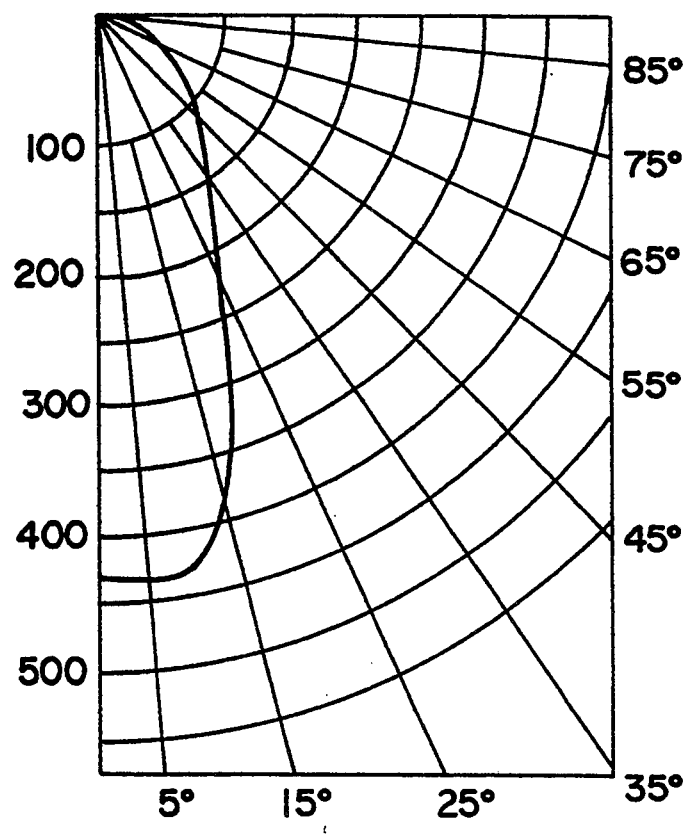

The use of four reflecting surface segments 36a–36d is based upon a recognition that the light output from compact fluorescent lamp is not consistent radially around the lamp. By reference to FIG. 6 and 7, it is seen that as one travels from a 0° position along the axis separating pairs of tubes 30 to an opposing position 180° along said axis, the light output at first increases to a 45° position then decreases towards a 90° position, after which the light output again increases to a 135° position and decreases to the 180° position. Therefore, by locating tubes 30 at the foci of reflectant services 36a–36d a vertical light output of over 500 lumens is achieved as illustrated graphically in FIG. 8a. This is a significant improvement over a conventional replacement fluorescent lighting device, whose output is illustrated in FIG. 8b. The conventional product produces less than 450 lumens in a vertical direction. Therefore, although the present replacement fluorescent lighting device consumes the same amount of energy and produces the same amount of light output, the light is more usefully directed to the task as seen by comparing FIGS. 8a and 8b.

Figure 9:
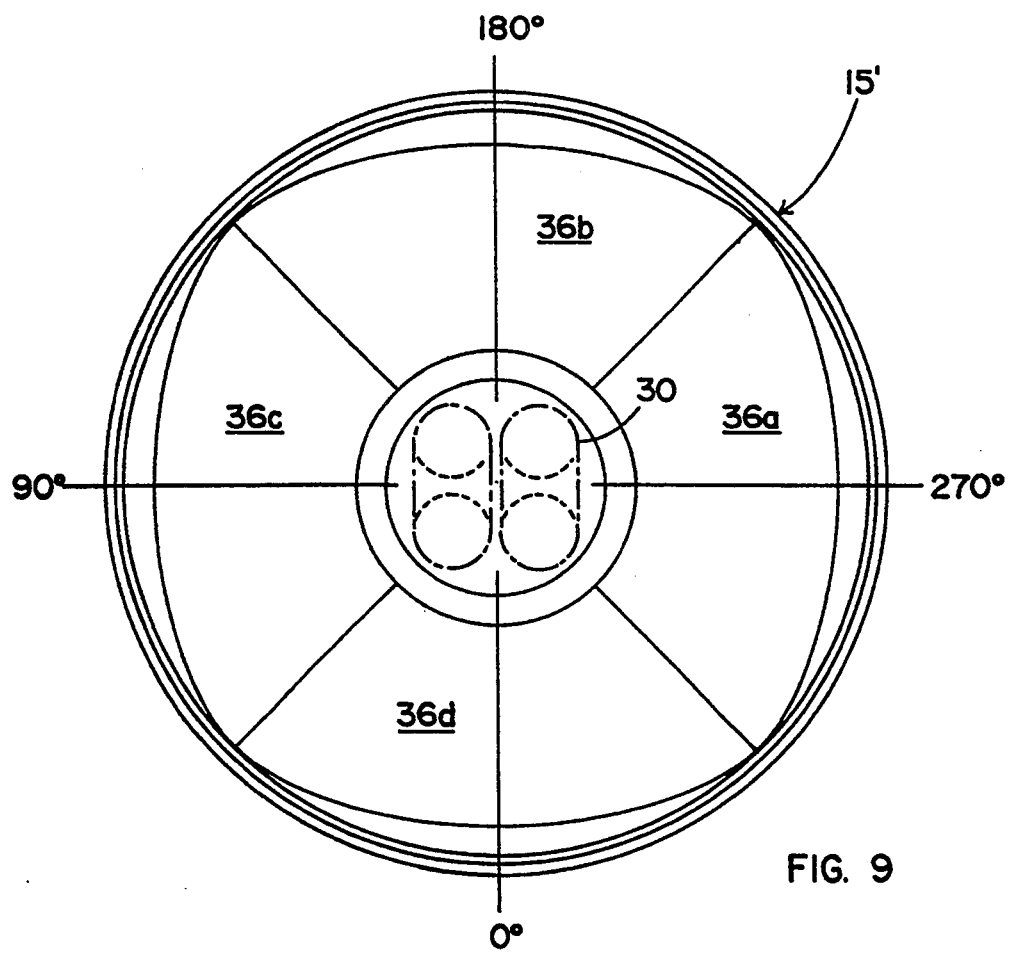
FIG. 9 is the same view as FIG. 2 of an alternative embodiment of the invention.
Figure 10:
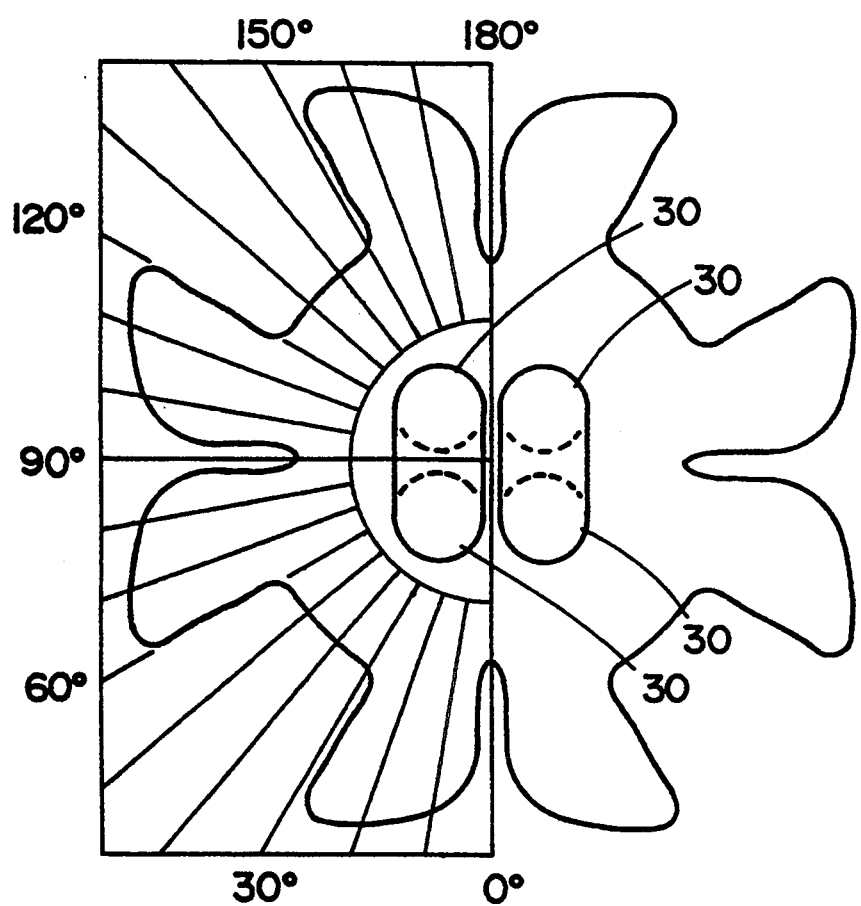
FIG. 10 is a polar graph of the radial light output of a four-tube lighting device with finer resolution than the graph in FIG. 7.

FIG. 10 illustrates a more precise measurement of the radial light output of compact fluorescent lamp 18. As seen in FIG. 10, the light output increases from 0° axis to approximately 30° but decreases between about 30° and 60° where it increases again prior to decreasing at about 90°. The same pattern repeats from 90° to the 180° axis. This more precise measurement of the light output of lamp 18 gives rise to a second embodiment of replacement fluorescent lighting device designated 15' in FIG. 9. For lighting device 15' the 0°, 90°, 180° and 270° axes of the light output diagram of FIG. 10 are aligned with reflecting surface segments 36a–36d. By comparing FIGS. 9 and 10, it can be seen that two major light output lobes exist adjacent the major axes of the light chart in FIG. 10. Therefore, although a valley in the light chart is positioned adjacent each reflecting surface segment 36a–36d, the overall effect is to increase the amount of light reflected by each surface segment 36a–36d. It may be seen by comparing FIGS. 2 and 9 that the lamp placement in lighting device 15' is 45° offset from that in lighting device 15. While replacement lighting device 15 experiences a significant improvement in light output over conventional replacement fluorescent lighting devices, the output of lighting device 15' is greater yet.

Thus it is seen that the present invention is based upon the sweeping of a parabola around an axis with the focus of the parabola offset from the axis. This defines a focus ring segment in order to provide a circular foci which more closely conforms with the light generating surfaces of a compact fluorescent lamp. Improved results are obtained by providing a plurality of such surfaces with different foci. Two such surfaces completely surround the tube bundle of the compact fluorescent lamp. Other reflectance surface segments are radially aligned with lobes in the light output of the compact fluorescent lamp. In a most preferred embodiment, the various foci are arranged at different longitudinal positions along the axis of elongation of the lamp, as illustrated in FIG. 4. In this manner, light output is efficiently reflected in the direction of the task in order to improve overall efficiency. This may be obtained in a manner which reduces the overall diameter and maximum overall length (MOL) of the lighting device.

While the invention has been illustrated as a replacement fluorescent lighting device used with a conventional incandescent lighting fixture, it may find application in defining the reflecting surface of a lighting fixture which directly receives a compact fluorescent lamp. Such lighting fixture may be a recessed lighting fixture that mounts within an opening in a ceiling, or the like. The invention is useful both with and without a lens 22. As set forth above, the primary purpose of lens 22, in addition to providing a completely enclosed unit, is in order to either direct the light along axis X in order to produce a spot or to defuse the light in order to produce a flood light.

Changes in modifications in the specifically described embodiments can be carried out without departing from the principles of the invention, which is intended to be limited only by the scope of the appended claims, as interpreted according to the principles of patent law including the Doctrine of Equivalents.

The embodiments of the invention in which an exclusive property or privilege is claimed are defined as follows:

1. A compact fluorescent lamp reflector for use with a fluorescent lamp having a given number of parallel tubes each elongated along an axis of elongation comprising:
   a body including an annular wall having a reflecting inner surface segment defined by a geometric curve rotated at least partially about a given axis that is generally parallel the axis of elongation of the fluorescent tubes;
   said geometric curve having a focal point wherein light rays emanating from said focal point and contacting substantially any point on said geometric curve will be reflected generally parallel said given axis; and
   said focal point being laterally offset from said given axis whereby said reflecting inner surface segment will have a focal ring segment.

2. The reflector in claim 1 wherein said annular wall has a central axis and wherein said given axis is aligned with said central axis whereby said focal ring segment is centered on said central axis.

3. The reflector in claim 1 wherein said annular wall has a central axis and wherein said given axis is spaced from said central axis whereby said focal ring segment is offset from said central axis.

4. The reflector in claim 3 including a plurality of said reflecting inner surface segments spaced around said annular wall, one for each tube of the fluorescent lamp.

5. The reflector in claim 1 wherein said geometric curve is a parabola.

6. A compact fluorescent lamp reflector for use with a fluorescent lamp having a given number of parallel tubes, each elongated along an axis of elongation comprising:
   a body including an annular wall extending around a central axis that is generally parallel the axis of elongation of the tubes and having a reflecting inner surface;
   said reflecting inner surface including a plurality of surface segments spaced around said annular wall, each one of said surface segments defined by a geometric curve rotated at least partially around a given axis that is generally parallel said central axis and separated therefrom, each said geometric curve having a focal point wherein light rays emanating from that focal point and contacting substantially any point on the corresponding geometric curve will be reflected generally parallel said given axis, wherein the focal point for each said geometric curve is laterally offset from the given axis for that geometric curve whereby each one of said surface segments will have a focal ring segment.

7. The reflector in claim 6 wherein said reflecting inner surface further includes a first annular surface ring longitudinally outboard of said plurality of surface segments.

8. The reflector in claim 7 wherein said first annular surface ring is defined by another geometric curve rotated at least partially about another given axis that is generally parallel the axis of elongation of the fluorescent tubes, wherein said another geometric curve has another said focal point and wherein said another said focal point is laterally offset from said another given axis whereby said first annular surface ring has a focal ring centered on said central axis.

9. The reflector in claim 8 wherein said focal ring is inboard of said focal ring segments.

10. The reflector in claim 7 wherein said reflecting inner surface further includes a second annular surface ring inboard of said plurality of surface segments.

11. The reflector in claim 10 wherein said second annular surface ring is defined by another geometric curve rotated at least partially about another given axis that is generally parallel the axis of elongation of the fluorescent tubes, wherein said another geometric curve has another said focal point and wherein said another said focal point is laterally offset from said given another axis whereby said second annular surface ring has a focal ring centered on said central axis.

12. The reflector in claim 11 wherein said focal ring is longitudinally inboard of said focal ring segments.

13. The reflector in claim 6 wherein said reflecting inner surface further includes an annular surface ring longitudinally inboard of said plurality of surface segments.

14. The reflector in claim 13 wherein said annular surface ring is defined by another geometric curve rotated at least partially about another given axis that is generally parallel the axis of elongation of the fluorescent tubes, wherein said another geometric curve has another said focal point and wherein said another said focal point is laterally offset from said given axis whereby said annular surface ring has a focal ring centered on said central axis.

15. The reflector in claim 14 wherein said focal ring is longitudinally inboard of said focal ring segments.

16. A replacement fluorescent lighting device comprising:
   a fluorescent lamp having a plurality of parallel tubes each elongated along an axis of elongation;
   a reflector having a body including an annular wall having a reflecting inner surface segment defined by a geometric curve rotated at least partially about a given axis that is generally parallel said axis of elongation;
   said geometric curve having a focal point wherein light rays emanating from said focal point and contacting substantially any point on said geometric curve will be reflected generally parallel said given axis; and
   said focal point being laterally offset from said given axis whereby said reflecting inner surface segment will have a focal ring segment.

17. The lighting device in claim 16 wherein said annular wall has a central axis and wherein said given axis is aligned with said central axis whereby said focal ring segment is centered on said central axis.

18. The lighting device in claim 16 wherein said annular wall has a central axis and wherein said given axis is spaced from said central axis whereby said focal ring segment is offset from said central axis.

19. The lighting device in claim 18 including a plurality of said reflecting inner surface segments spaced around said annular wall, one for each of said parallel tubes.

20. The lighting device in claim 16 wherein said geometric curve is a parabola.

21. A replacement fluorescent lighting device comprising:
a fluorescent lamp having a plurality of parallel tubes, each elongated along an axis of elongation;
a reflector having a body including an annular wall extending around a central axis that is generally parallel the axis of elongation of the tubes and having a reflecting inner surface;
said reflecting inner surface including a plurality of surface segments spaced around said annular wall, each one of said surface segments defined by a geometric curve rotated at least partially around a given axis that is generally parallel said central axis and separated therefrom, each said geometric curve having a focal point wherein light rays emanating from that focal point and contacting substantially any point on the corresponding geometric curve will be reflected generally parallel said given axis, wherein the focal point for each said geometric curve is laterally offset from the given axis for that geometric curve whereby each one of said surface segments will have a focal ring segment.

22. The lighting device in claim 21 wherein said reflecting inner surface further includes a first annular surface ring longitudinally outboard of said plurality of surface segments.

23. The lighting device in claim 22 wherein said first annular surface ring is defined by another geometric curve rotated at least partially about another given axis that is generally parallel the axis of elongation of the fluorescent tubes, wherein said another geometric curve has another said focal point and wherein said another said focal point is laterally offset from said another given axis whereby said first annular surface ring has a focal ring centered on said central axis.

24. The lighting device in claim 23 wherein said focal ring is inboard of said focal ring segments.

25. The lighting device in claim 22 wherein said reflecting inner surface further includes a second annular surface ring inboard of said plurality of surface segments.

26. The lighting device in claim 25 wherein said second annular surface ring is defined by another geometric curve rotated at least partially about another given axis that is generally parallel the axis of elongation of the fluorescent tubes, wherein said another geometric curve has another said focal point and wherein said another said focal point is laterally offset from said another given axis whereby said second annular surface ring has a focal ring centered on said central axis.

27. The lighting device in claim 26 wherein said focal ring is longitudinally inboard of said focal ring segments.

28. The lighting device in claim 21 wherein said reflecting inner surface further includes an annular surface ring longitudinally inboard of said plurality of surface segments.

29. The lighting device in claim 28 wherein said annular surface ring is defined by another geometric curve rotated at least partially about another given axis that is generally parallel the axis of elongation of the fluorescent tubes, wherein said another geometric curve has another said focal point and wherein said another said focal point is laterally offset from said another given axis whereby said annular surface ring has a focal ring centered on said central axis.

30. The lighting device in claim 29 wherein said focal ring is longitudinally inboard of said focal ring segments.

31. The lighting device in claim 21 wherein the number of said surface segments corresponds with the number of said parallel tubes and wherein each one of said parallel tubes is radially centered with respect to one of said surface segments.

32. The lighting device in claim 21 wherein the number of said surface segments corresponds with the number of said parallel tubes and wherein adjacent ones of said tubes define a tube interface and further wherein each said tube interface is radially centered with respect to one of said surface segments.

33. A compact fluorescent lamp reflector for use with a fluorescent lamp having a given number of parallel tubes, each elongated along an axis of elongation comprising:
a body including an annular wall extending around a central axis that is generally parallel the axis of elongation of the tubes and having a reflecting inner surface;
said reflecting inner surface including a plurality of surface segments spaced around said annular wall, each one of said surface segments defined by a geometric curve rotated at least partially around a given axis that is generally parallel said central axis and separated therefrom;
said reflecting inner surface further including a first annular surface ring longitudinally outboard of said plurality of surface segments; and
said reflecting inner surface further including a second annular surface ring longitudinally inboard of said plurality of surface segments.

34. A replacement fluorescent lighting device comprising:
a fluorescent lamp having a plurality of parallel tubes, each elongated along an axis of elongation;
a reflector having a body including an annular wall extending around a central axis that is generally parallel the axis of elongation of the tubes and having a reflecting inner surface;
said reflecting inner surface including a plurality of surface segments spaced around said annular wall, each one of said surface segments defined by a geometric curve rotated at least partially around a given axis that is generally parallel said central axis and separated therefrom;
said reflecting inner surface further including a first annular surface ring longitudinally outboard of said plurality of surface segments; and
said reflecting inner surface further including a second annular surface ring inboard of said plurality of surface segments.

35. A compact fluorescent lamp adapter for use with a fluorescent lamp having a given number of parallel tubes, each elongated along an axis of elongation comprising:
- a base for receiving a fluorescent lamp with the axis of elongation of the lamp tubes parallel to and in a particular orientation about a central axis;
- a reflector around said lamp having a body including an annular wall extending around said central axis and having a reflecting inner surface; and
- said reflecting inner surface including a plurality of surface segments spaced around said annular wall, each one of said surface segments defined by a geometric curve rotated at least partially around a given axis that is generally parallel said central axis and separated therefrom, wherein said surface segments are positioned with respect to said base in order to coincide with major lumen output lobes of a lamp received in said base.

36. A replacement fluorescent lighting device comprising:
- a fluorescent lamp having a plurality of parallel tubes, each elongated along an axis of elongation;
- a reflector having a body including an annular wall extending around a central axis that is generally parallel the axis of elongation of the tubes and having a reflecting inner surface; and
- said reflecting inner surface including a plurality of surface segments equal in number at least to the number of said plurality of parallel tubes, each one of said surface segments defined by a geometric curve rotated at least partially around a given axis that is generally parallel said central axis and separated therefrom, wherein said surface segments are positioned at major lumen output lobes of said lamp.

* * * * *